United States Patent

Kinsman et al.

[11] Patent Number: 5,874,708
[45] Date of Patent: Feb. 23, 1999

[54] CASER SEAM WELDING OF ALUMINUM ALLOYS

[76] Inventors: Kenneth Grant Kinsman, 634 Grange Crescent, Waterloo, Ontario, Canada, LoG 1K0; Walter W. Duley, 324 Amberwood Drive, Waterloo, Ontario, Canada, N2T 2A1

[21] Appl. No.: 4,127
[22] Filed: Jan. 13, 1993

[30] Foreign Application Priority Data

Jan. 13, 1992 [GB] United Kingdom .................... 9200622

[51] Int. Cl.⁶ ................................................... B23K 26/00
[52] U.S. Cl. ...................................................... 219/121.64
[58] Field of Search ........................ 219/121.63, 121.64, 219/121.68, 121.69, 121.8, 121.81; 228/227, 230, 232, 262.5; 148/525, 535

[56] References Cited

U.S. PATENT DOCUMENTS

| | | |
|---|---|---|
| 3,467,098 | 9/1969 | Ayres . |
| 4,560,100 | 12/1985 | Hall . |
| 4,665,294 | 5/1987 | Hira et al. .......................... 219/121.64 |
| 4,785,156 | 11/1988 | Benko et al. . |
| 4,820,355 | 4/1989 | Bampton ................................. 228/232 |
| 4,830,265 | 5/1989 | Kennedy et al. ......................... 148/525 |
| 4,857,699 | 8/1989 | Duley et al. ........................ 219/121.85 |
| 4,877,939 | 10/1989 | Duley et al. .................... 219/121.68 X |
| 4,880,709 | 11/1989 | Holroyd et al. ......................... 228/262.5 |
| 4,891,491 | 1/1990 | Duley et al. ....................... 219/121.64 |

FOREIGN PATENT DOCUMENTS

| | | |
|---|---|---|
| 0373345 | 6/1990 | European Pat. Off. . |
| 4017286 | 12/1991 | Germany . |
| 64-62291 | 3/1989 | Japan ................................ 219/121.64 |
| 2-224885 | 9/1990 | Japan ................................ 219/121.64 |
| 4270088 | 9/1992 | Japan ................................ 219/121.64 |

OTHER PUBLICATIONS

IBM Technical Disclosure Bulletin, Vo. 33, No. 5, Oct. 1990, pp. 122–123.

Primary Examiner—Geoffrey S. Evans

[57] ABSTRACT

A method of welding aluminum alloy workpieces includes the pretreatment of an area adjacent to the seam of the workpiece followed by irradiation of the area with an infrared laser beam having a diameter equal to or greater than the thickness of the workpieces. Substantial subsurface melting of the workpieces is initially generated and the beam can subsequently be scanned along the seam so as to maintain an isotherm corresponding to the melting point of the workpiece at the leading edge of the beam.

16 Claims, 4 Drawing Sheets

| CO2 LASER POWER (W) | DWELL TIME $T_D$ (sec) | WELDING SPEED (mm/sec) | TENSILE STRENGTH (MPa) |
|---|---|---|---|
| 1423 | 2 | 2.2 | 282 |
| 1428 | 2 | 2.35 | 289 |
| 1421 | 2.5 | 2.2 | 300 |
| 1434 | 3 | 2.35 | 300 |
| 1544 | 3.5 | 2.54 | 330 |

FIG. 6

CASER SEAM WELDING OF ALUMINUM ALLOYS

This inventions relates in general to laser welding, and more particularly to $CO_2$ laser conduction welding of Al 7000 series as embodied in welding of the alloy Al 7075.

Laser welding of a material involves the use of laser irradiation to heat the surface and subsequently the bulk of the material to the melting temperature by which the joining process is accomplished as liquid from separate parts flow together and subsequently solidify.

Applications of lasers to welding are well known. The following literature provides a disclosure of prior art technology in this area: B. Thorstensen, "Laser Welding of Aluminum", Annual Review of Laser Processing, p. 64, Penwell Publishing Co. 1989; W. W. Duley, "Laser Processing and Analysis of Materials", Plenum Press, 1983. Also, certain advances have been made by Steen in Great Britain concerning the mixing of two wavelengths of the laser light at a single spot for initiating welding of materials.

However, the laser processing efficiency of the laser depends upon the state of the surface and the physical nature of the material. Metal surfaces in particular are generally highly reflective of laser light emitted in the infrared region (e.g. light produced by a $CO_2$ laser), so that only a fraction of incident laser radiation is absorbed and converted to heat. Thus, metals such as copper, aluminum and silver and their alloys are difficult to weld with an infrared laser, which is the most commonly available type of laser having sufficient power to perform the process.

As discussed in the Thorstensen article referred to above, some aluminum alloys can be laser welded. However, the higher initial reflectivity and bulk thermal conductivity of these alloys make the process more difficult to initiate than, for example, steel. The conventional approach is to increase the incident intensity of the laser beam until a deep penetration of "keyhole" has been achieved. However, major faults such as cracks, undercuts, inclusions, inadequate penetration, pores, evaporation of alloying elements and lack of beam coupling can occur. Successful $CO_2$ laser welding of the series 7000 alloys, which are known as the most crack sensitive of the alloy types, has not yet been reported.

SUMMARY OF THE INVENTION

It is an object of the present invention to utilize the principles disclosed in the applicant's U.S. Pat. Nos. 4,857,699, 4,877,939 and 4,891,491 entitled "Means of Enhancing Laser Processing Efficiency of Metals" (incorporated herein by reference) for achieving high quality welds in Al 7075. According to the invention, this object is met by enhancing the initial absorptivity of the metal surface.

A further object of the present invention is to describe a new beam geometry made possible because of the reduced reflectivity provided by pre-treating the surface of the material to be welded. Increasing the beam spot size on the workpiece fundamentally alters the welding process. Specifically, according to the invention, the spot size of the incident beam is enlarged to dimensions equal to or greater than the thickness of the plate being joined, such that the thermal boundary conditions of the process are modified. A uniform irradiating beam appears across the front surface relative to a frame of reference at the rear surface. This influences the processing event as thermal waves reflect from the rear surface crating a larger more stable heat affected zone.

Also, according to the conduction limited welding technique of the present invention, the surface remains intact and therefore no loss of volatile components occurs within the alloy. Conventionally, it is required to focus the laser in as narrow a beam as possible so as to break down the surface (overcoming the high reflectivity) and create a keyholing geometry. In this geometry, the finite thickness of the plate is subjected initially to a point source of heat on the surface. The disadvantage of this geometry is that much heat is conducted laterally into the bulk material. It also exposes the interior of the weld to atmospheric gas which can yield porosity.

BRIEF DESCRIPTION OF THE DRAWINGS

Embodiments of the invention will now be described with reference to the accompanying drawings, plots and tables, in which

FIG. 6 is a table showing measured tensile strength and primary experimental parameters of Al 7075 T6 welded according to the principles of the invention.

DETAILED DESCRIPTION

Figure 1:
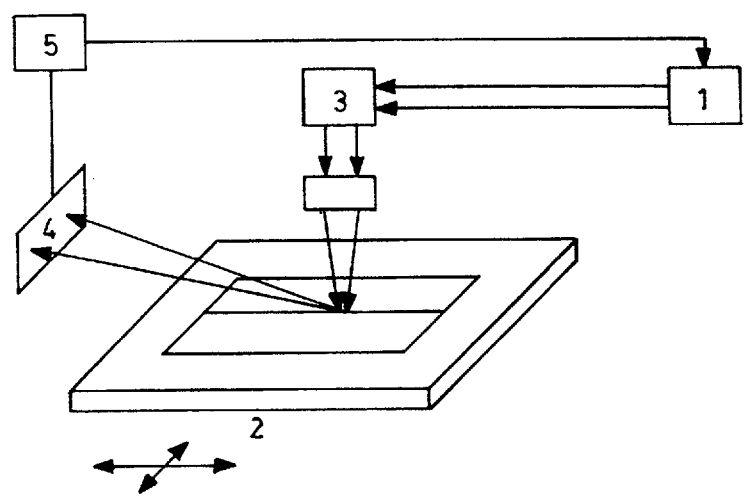
FIG. 1 is a schematic illustration of a system for laser welding Al 7075.

Referring now to FIG. 1, $CO_2$ or infrared laser source 1 delivers laser irradiation to a 2 or 3 axis CNC motion system 2 by a fixed beam delivery system 3. A feedback sensor array 4 monitors processing variables, and returns information on the state, size and temperature of the weld pool. This information is received by the control computer 5 for real-time analysis, correction signals being generated by the computer 5 for control of the laser and/or motion system.

Figure 2:
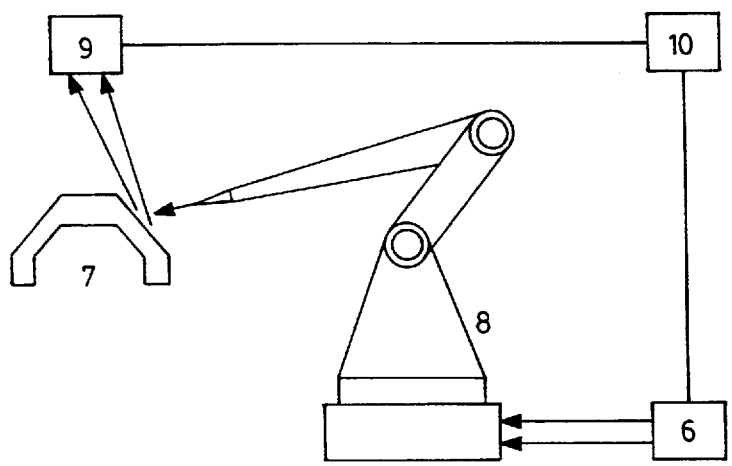
FIG. 2 shows an alternative embodiment of the laser welding system of the present invention.

Alternatively, in the arrangement of FIG. 2, the $CO_2$ or infrared laser source 6 delivers laser irradiation to the workpiece 7 by a multi-axis (5 or 6 axis) laser robot 8. In this configuration, the laser robot has either learned, or has been preprogrammed or utilizes seam tracking technology to correctly follow the joint to be welded. As in the embodiment of FIG. 1, a feedback sensor array 9 monitors processing variables, returning information on the state, size and temperature of the weld pool. This information is received by the control computer 10 for real time analysis, correction signals being generated by the computer 10 for controlling the laser and/or motion system.

Figure 3:
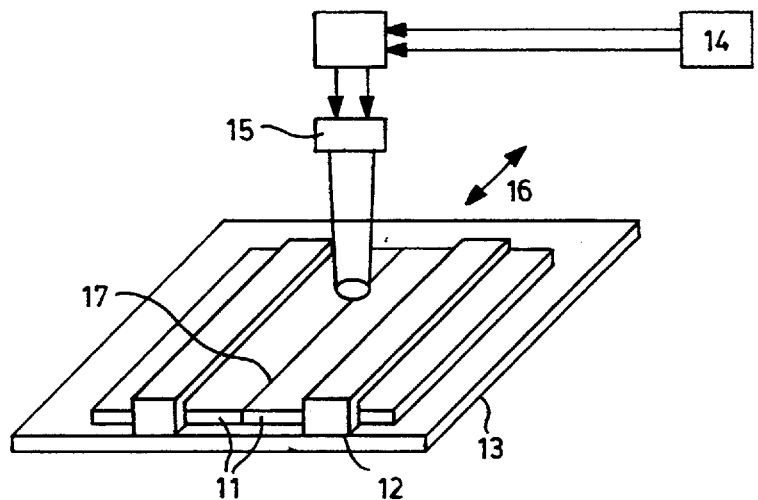
FIG. 3 shows a novel beam geometry according to this invention.

FIG. 3 is a schematic illustration of the new beam geometry of the present invention showing the incident laser beam on the pre-treated metal surface. In the arrangement of FIG. 3, the material to be joined 1 is held in an appropriate jig 12. Depending upon the geometry of the material, it can then be mounted on a table 13 capable of being programmed for motion in at least two orthogonal axes. An infrared laser 14 is positioned to generate a beam of infrared radiation through a lens 15 or system of optics to control the incident area of irradiation of the workpiece. This incident area is characterized by a diameter that is equal to or greater than the thickness of the workpiece.

One area of pretreatment 16 which is equal to or larger than the dimensions of the irradiated area of the incident laser beam is located where the weld is to be initiated. Pre-treatment is performed by an excimer laser and is only required to initiate the welding process.

The $CO_2$ laser beam impinges on this pre-treated area for a sufficient dwell time, td (which is a function of the workpiece thickness and incident laser intensity) to form a massive amount of subsurface melting. This melting occurs by conduction from the front surface being irradiated with the $CO_2$ laser. After melting occurs below the region of pre-treatment, the laser can be scanned along the seam. The $CO_2$ laser is then scanned along the seam 17 to be welded. The scanning rate is determined so that the melting isotherm remains at the leading edge. During this scanning, sufficient coupling occurs through real-time oxidation of the irradiated surface to support a melting isotherm.

During this scanning, no shielding gases are required since an environment of ambient air is required to support real-time oxidation of the melting front and protection of the focusing optics is not required since the beam is defocused. However, it is contemplated that the $O_2$ content may be increased in the welding environment in certain applications.

This improved means of welding is not dependent upon excimer laser (or any other UV laser) pre-treatment. Other means may be found (torch, plasma, coatings, etc.) that achieves the same effect, that is, to enable rapid and massive melting in the Al alloy. Once a means of establishing a melting isotherm has been created, the $CO_2$ laser beam geometry as described is capable of supporting it.

By reducing the initial reflectivity, the threshold intensity for the welding process is lowered by enlarging the spot size of the $CO_2$ laser beam on the workpiece surface and by enlarging the incident spot size of the laser beam, more efficient heating of the workpiece occurs.

Figure 4:
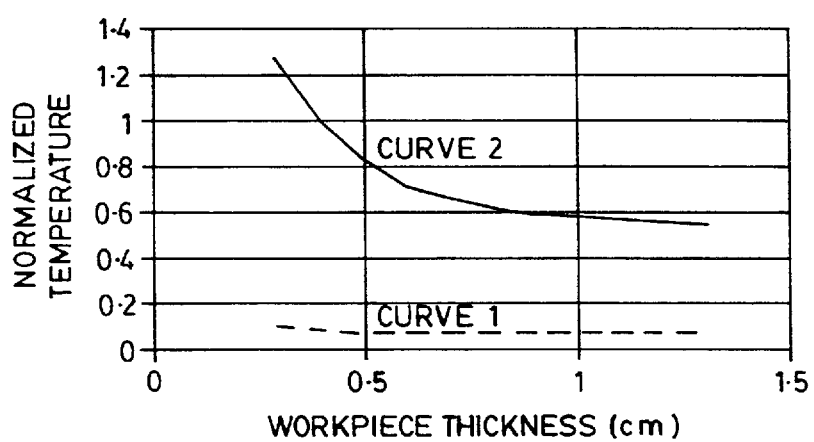
FIG. 4 shows two plots of normalized temperature vs. workpiece thickness for Al alloy which has not been treated and for Al alloy which has been pre-treated according to the principles of the invention.

FIG. 4 is a theoretical plot for a solution of the one dimensional heat conduction equation, for the case of no internal sources of heat but with a flux of intensity Io entering at Z=0. This solution is written in the form $$T(z, t) = \frac{\in I_o xt}{kl} + \frac{\in I_o l}{k}\left[\frac{3(l-z)^2 - l^2}{6l^2} - \frac{2}{\pi}\sum_{n=1}^{\infty}\frac{(-1)^n}{n^2}e^{\frac{-xn^2xt}{l^2}}\cos\left(\frac{n\pi(l-z)}{l}\right)\right]$$

where $$K = \text{Thermal conductivity}\left(\frac{W}{(\text{cm})(\text{degrees centigrade})}\right)$$

$$\kappa = \text{Thermal diffusivity}\left(\frac{cm^2}{sec}\right)$$

$\alpha$=Absorptivity $$I_o = \text{Incident intensity}\left(\frac{W}{cm^2}\right)$$

t=Time (sec)
l=Workpiece thickness (cm)

FIG. 4 shows two curves of theoretical data using equation 1 for the case of z=0 and dwell time, $t_d$=0.5 sec. Curves 1 and 2 both represent the temperature at the surface of material as a function of the sheet thickness. The incident intensity used for both curves is $I_o$=7×10$_3$ W cm$_{-2}$. Temperature on the y axis has been normalized to an effective melting temperature, which takes into account the latent heat of fusion of the Al alloy. Curve 1 presents an Al surface which has been left untreated by any process (absorptivity, $\alpha$=0.003). the plot shows that the high initial reflectivity inhibits any significant heating. Curve 2 shows data for an Al surface which has been pre-treated to increase the initial absorptivity to $\alpha$=0.3. This theoretical curve verifies that Al surfaces can melt for thicknesses close to 0.3 cm at $I_o$=7×10$^3$ W cm$^{-2}$.

Figure 5:
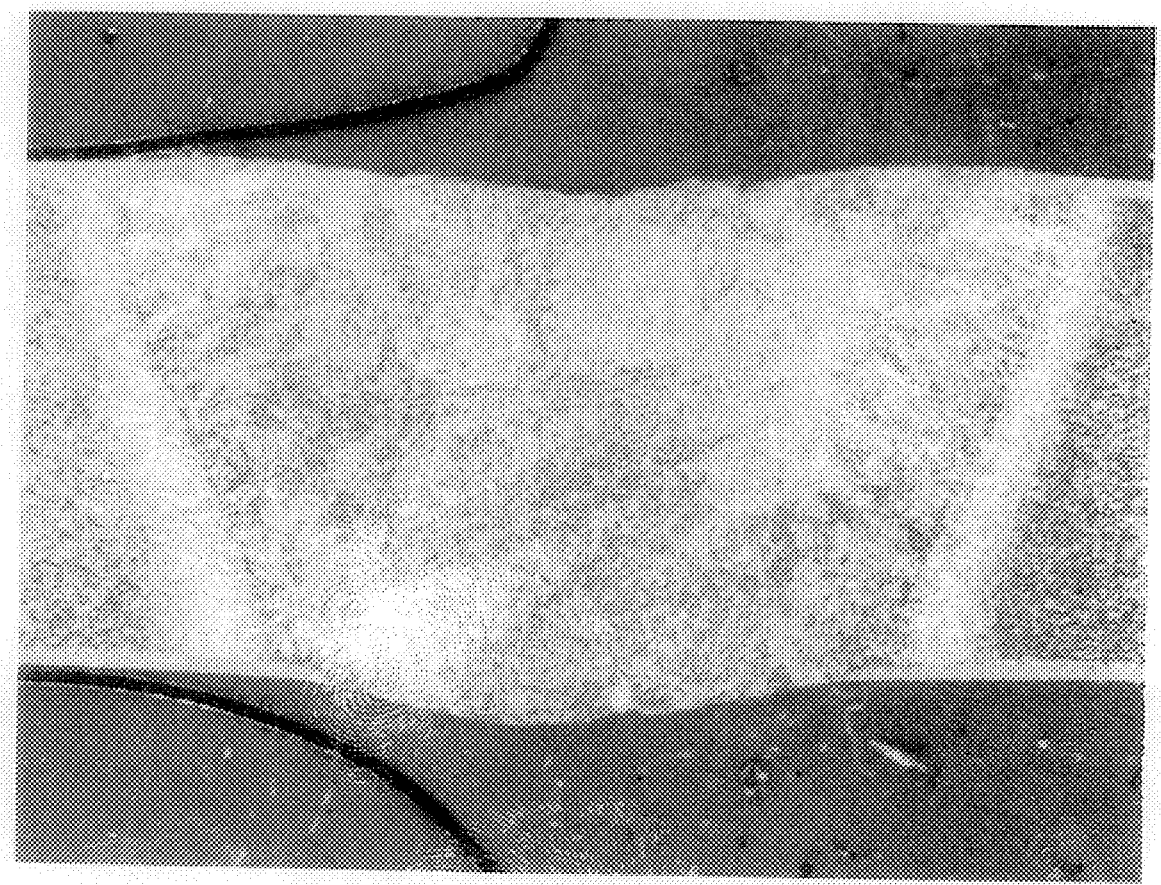
FIG. 5 is an optical micrograph showing a cross-section view of series 7000 aluminum welded according to the principles of the invention.

FIG. 5 shows an optical micrograph of a cross-section view of two 3 mm thick Al 775 T6 plates successfully butt welded according to the principles of the present invention. The welding speed was 2.5 mm sec$^{-1}$ and the incident lasing power was 1450 Watts. The micrograph clearly shows evidence of a massive conduction limited weld which has been previously unattainable in Al limited allows. A melting efficiency, $\eta$ factor which ratios the energy required to melt the metal to the energy incident from the laser beam can be written as $$\eta = \frac{bv\rho(C\Delta T + \Delta H)}{P}$$

where b=melting cross-sectional area (cm$^2$)

$$v = \text{welding speed}\left(\frac{cm}{sec}\right)$$

P=$CO_2$ laser power (W)
$\Delta H$=latent heat of fusion $$\rho = \text{density}\left(\frac{gms}{cm^3}\right)$$

The weld shown in FIG. 5 indicates a welding efficiency of approximately 0.11.

FIG. 6 is a table showing measured tensile strength and primary experimental parameters of welded Al 7075 using the principles of the invention. Moreover, it is found that the alloy composition is not affected significantly through the weldment and the heat affected zone. This improved means of welding is not specific to the $CO_2$ laser. Other laser sources such as the YAG laser, emitting at a wavelength of 1.06 $\mu$m, or lasers emitting at other wavelengths (CO lasers) in the infrared can be utilized.

Although described for use with 7000 series alloys, the process may be used on other materials exhibiting similar properties. For example, it is contemplated that the principles disclosed herein may be used for welding of other materials such as aluminum based metal matrix composites (e.g. Al with embedded alumina particles). The new welding geometry and practice can also be applied to other difficult-to-weld Al alloys (500 and 6000 series).

5000 series aluminum alloys are defined by the Aluminum Association, Inc. at pages 15 and 16 of the Aluminum Standards and Data as having the following nominal chemical composition:

| Percent of Alloying Elements - Aluminum and Normal Impurities Constitute Remainder | | | | | | | | |
|---|---|---|---|---|---|---|---|---|
| Alloy | Silicon | Copper | Manganese | Magnesium | Chromium | Nickel | Zinc | Titanium |
| 5005 | | | | 0.8 | | | | |
| 5050 | | | | 1.4 | | | | |
| 5052 | | | | 2.5 | 0.25 | | | |
| 5056 | | | 0.12 | 5.0 | 0.12 | | | |
| 5083 | | | 0.7 | 4.4 | 0.15 | | | |
| 5086 | | | 0.45 | 4.0 | 0.15 | | | |
| 5154 | | | | 3.5 | 0.25 | | | |
| 5183 | | | 0.8 | 4.8 | 0.15 | | | |
| 5252 | | | | 2.5 | | | | |
| 5254 | | | | 3.5 | 0.25 | | | |
| 5356 | | | 0.12 | 5.0 | 0.12 | | | 0.13 |
| 5454 | | | 0.8 | 2.7 | 0.12 | | | |
| 5456 | | | 0.8 | 5.1 | 0.12 | | | |
| 5457 | | | 0.30 | 1.0 | | | | |
| 5554 | | | 0.8 | 2.7 | 0.12 | | | 0.12 |
| 5556 | | | 0.8 | 5.1 | 0.12 | | | 0.12 |
| 5652 | | | | 2.5 | 0.25 | | | |
| 5654 | | | | 3.5 | 0.25 | | | 0.10 |
| 5657 | | | | 0.8 | | | | |

Similarly, 6000 series aluminum alloys are defined as having the following nominal chemical composition:

| Percent of Alloy Elements - Aluminum and Normal Impurities Constitute Remainder | | | | | | | | |
|---|---|---|---|---|---|---|---|---|
| Alloy | Silicon | Copper | Manganese | Magnesium | Chromium | Nickel | Zinc | Titanium |
| 6003 | 0.7 | | | 1.2 | | | | |
| 6005 | 0.8 | | | 0.50 | | | | |
| 6053 | 0.7 | | | 1.2 | 0.25 | | | |
| 6061 | 0.6 | 0.28 | | 1.0 | 0.20 | | | |
| 6083 | 0.40 | | | 0.7 | | | | |
| 6066 | 1.4 | 1.0 | 0.8 | 1.1 | | | | |
| 6070 | 1.4 | 0.28 | 0.7 | 0.8 | | | | |
| 6101 | 0.50 | | | 0.6 | | | | |
| 6105 | 0.8 | | | 0.62 | | | | |
| 6151 | 0.9 | | | 0.6 | 0.25 | | | |
| 6182 | 0.6 | | | 0.9 | | | | |
| 6201 | 0.7 | | | 0.8 | | | | |
| 6253 | 0.7 | | | 1.2 | 0.25 | | 2.0 | |
| 6262 | 0.6 | 0.28 | | 1.0 | 0.09 | | | |
| 6351 | 1.0 | | 0.6 | 0.6 | | | | |
| 6463 | 0.40 | | | 0.7 | | | | |
| 6951 | 0.35 | 0.28 | | 0.6 | | | | |

7000 series aluminium alloys are defined as having the following nominal chemical composition:

| Percent of Alloy Elements - Aluminum and Normal Impurities Constitute Remainder | | | | | | | | |
|---|---|---|---|---|---|---|---|---|
| Alloy | Silicon | Copper | Manganese | Magnesium | Chromium | Nickel | Zinc | Titanium |
| 7005 | | | 0.45 | 1.4 | 0.13 | | 4.5 | 0.04 |
| 7008 | | | | 1.0 | 0.18 | | 5.0 | |
| 7049 | | 1.6 | | 2.4 | 0.16 | | 7.7 | |
| 7050 | | 2.3 | | 2.2 | | | 8.2 | |
| 7072 | | | | | | | 1.0 | |
| 7075 | | 1.6 | | 2.5 | 0.23 | | 5.6 | |
| 7108 | | | | 1.0 | | | 5.0 | |
| 7175 | | 1.6 | | 2.5 | 0.23 | | 5.6 | |
| 7178 | | 2.0 | | 2.8 | 0.23 | | 6.8 | |
| 7475 | | 1.6 | | 2.2 | 0.22 | | 5.7 | |

We claim:

1. A method of welding adjacent edges of a pair of workpieces of predetermined thickness that abut along a seam, said method comprising the steps of pre-treating an area of a surface of said workpieces adjacent to said seam to reduce the reflectivity thereof, irradiating said area with an infrared laser beam having a diameter equal to or greater than said thickness of said workpieces for a predetermined time to generate substantial subsurface melting of said workpieces and subsequently scanning said beam along said seam at a rate to maintain an isotherm corresponding to the melting point of said workpieces at a leading edge of said beam.

2. A method according to claim 1 wherein said laser beam is generated by a $CO_2$ laser.

3. A method according to claim 1 wherein said laser beam is generated by a YAG laser.

4. A method according to claim 1 wherein said step of pre-treating includes irradiating said area with a different laser beam of different wavelength to said infrared beam.

5. A method according to claim 4 wherein said different laser beam is a UV laser beam.

6. A method according to claim 1 wherein said step of pre-treating includes surface treatment by a torch.

7. A method according to claim 1 wherein said step of pre-treating includes impingement by a plasma.

8. A method according to claim 1 wherein said step of pre-treating includes application of a coating.

9. A method according to claim 1 wherein said workpieces are formed from an alloy of aluminum.

10. A method according to claim 9 wherein said workpieces are selected from an alloy of aluminum comprising aluminum and at least one alloying element selected from the group consisting of silicon, copper, manganese, magnesium and chronimum.

11. A method according to claim 10 wherein said aluminum alloy includes 1.6% copper, 2.5% magnesium, 0.23% chronimum and 5.6% zinc by weight.

12. A method according to claim 11 wherein said infrared laser beam impinges upon said seam with a lasing power of between 1423 Watts and 1544 Watts.

13. A method according to claim 11 wherein said beam is scanned along said seam at a rate between 2.2 mm/sec and 2.54 mm/sec.

14. A method according to claim 1 wherein the oxygen content adjacent the weld is increased.

15. A method according to claim 10 wherein said aluminum alloy further comprises zinc as an alloying element.

16. A method according to claim 15 wherein said aluminum alloy includes between 1.0% and 7.7% by weight of zinc.

* * * * *

UNITED STATES PATENT AND TRADEMARK OFFICE
CERTIFICATE OF CORRECTION

PATENT NO. : 5,874,708
DATED : February 23, 1999
INVENTOR(S) : Kenneth G. Kinsman, Walter W. Duley It is certified that error appears in the above-identified patent and that said Letters Patent is hereby corrected as shown below:

Title,
Delete the term "Caser" and insert "Laser".

Signed and Sealed this

Twenty-fifth Day of September, 2001

*Attest:*

NICHOLAS P. GODICI
*Attesting Officer*  Acting Director of the United States Patent and Trademark Office